Aug. 3, 1948.                R. CHILTON                 2,446,409
                 TORQUE RESPONSIVE TRANSMISSION MEANS
Filed Jan. 8, 1945                              2 Sheets-Sheet 2
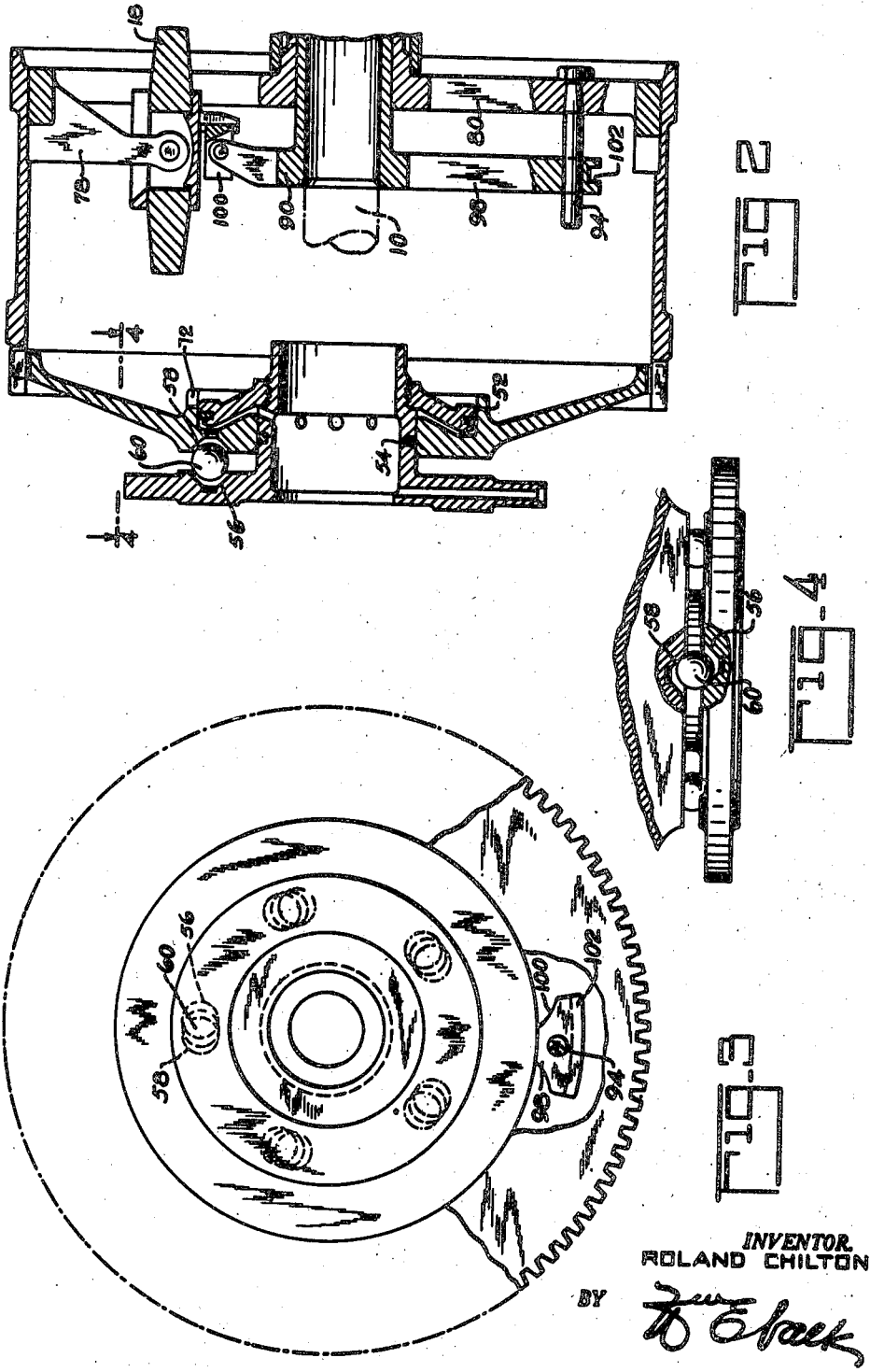
INVENTOR.
ROLAND CHILTON.
BY
ATTORNEY Patented Aug. 3, 1948

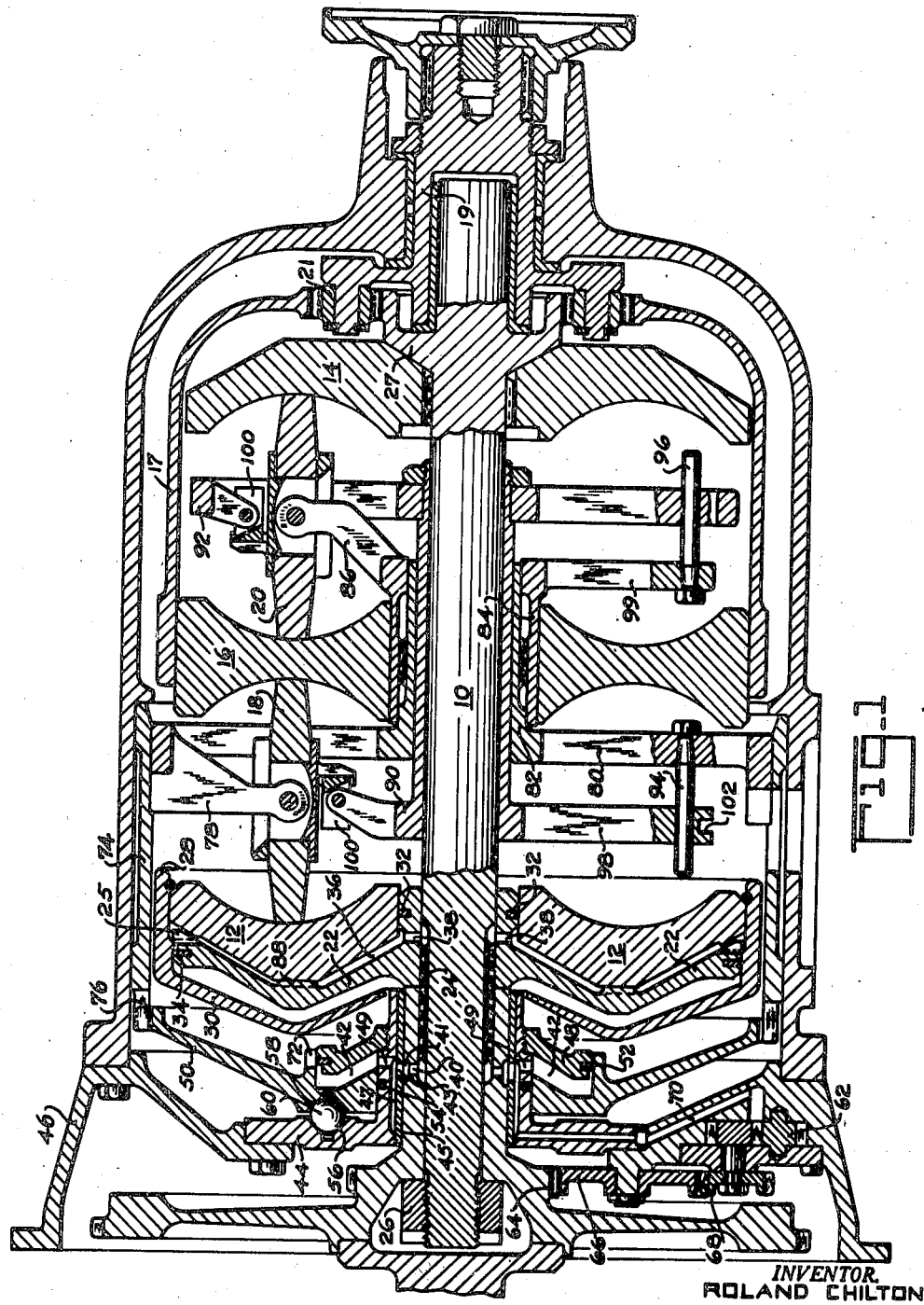

2,446,409

UNITED STATES PATENT OFFICE 2,446,409

TORQUE RESPONSIVE TRANSMISSION MEANS

Roland Chilton, Ridgewood, N. J., assignor to Allan Chilton and William E. Valk, doing business as joint adventurers, Ridgewood, N. J.

Application January 8, 1945, Serial No. 571,884

10 Claims. (Cl. 74—200)

This invention relates to variable speed transmissions and more particularly to torque-responsive contact-loading means therefor and in certain respects comprises improvements in the contact loading means disclosed in my Patents #2,061,896 and #2,040,833.

The invention is here illustrated as applied to a transmission comprising opposed toroidal discs which are loaded into driving contact with rollers, which may be pivoted to vary the drive ratio. In such transmissions it is desirable to have the roller contact load proportional to the tangential driving effort transmitted by the rollers and my patents referred to above disclose hydraulic means for this purpose whereby one member may be hydraulically contact-loaded with a force proportional to the torque on another member, without the use of thrust bearings subject to the contact load, notwithstanding that one of the members rotates relative to the other.

The transmission chosen for illustration is of the double-sided toroidal type wherein two sets of rollers are carried on frames which comprise the reaction member of the transmission. However, as will become apparent, the invention is applicable to any transmission in which elements of the transmission are to be contact-loaded with a force proportional to the torque. In the transmission illustrated, the respective sets of rollers are disposed between a double-sided central disc and two opposed end discs rotating together with a main shaft which acts as a tension member to transmit the contact-loading forces. In order to have the roller-contact load always proportional to the instant driving effort, over the whole range of transmitted torque and notwithstanding that the roller-contact radius on the toroidal discs is varied as the transmission drive ratio is changed, it is necessary that the contact load applied to the discs be proportional to the reactive force on the reaction member or roller carrier frames. The toroidal discs are rotating relative to the roller frames and the desired results are obtained by equipping one disc with a hydraulic-loading cylinder-and-piston combination and by yieldingly anchoring the roller frames through a torque meter hydraulically connected to the loading piston, whereby the hydraulic pressure in the system, and therefore the contact loads on the discs, is maintained in proportion to the driving reaction on the rollers.

The embodiment shown is intended for automobile transmissions wherein the driving torque may vary from zero to a maximum in a very short time interval, as from shocks to the driving wheels from road bumps. Under such conditions, it is necessary that the hydraulic contact-pressure should rise as rapidly as any suddenly applied torque loads, in order to prevent slipping at the roller-driving contacts. The maximum required contact loads are of relatively great magnitude, thereby subjecting the piston, disc, roller and shaft system to elastic deflections which cause a measurable axial motion at the contact-loading piston, corresponding to a certain volumetric increase in the piston cavity. Rapid torque increase involves a correspondingly rapid increase in hydraulic volume and the system must be capable of making-up the necessary oil volume to the piston with corresponding rapidity.

Under normal load conditions, the source of oil volume and pressure is a pump which would become unduly bulky if its rate of flow were sufficient to meet the high flow rates necessary to make up the sudden loading-piston displacement under shock loading conditions. Accordingly, a prime objective of the present invention consists in so proportioning the torque-meter itself that it may yield under shock loads sufficiently to displace the required volume of oil into the loading-piston independently of the flow rate from the pump. In other words, the torque-meter piston is given a sufficient total free stroke so that, before it reaches the limit of its travel, it will displace sufficient oil to supply the displacement of the loading piston due to the maximum deflection of the parts. In one aspect the invention may be expressed as a torque meter having a large hydraulic displacement range comprising a hydraulic spring-drive under elastic deflection of the contact-loaded transmission parts, the oil displacement from the torque meter being utilized to provide a pressure rise which is thus automatically as rapid as any load increase to which the transmission may be subject in use.

In the prior art, where torque meters have been used merely to indicate the torque on a driving system, e. g., as in my prior Patent No. 2,289,285 it has usually been desired to read mean torque and to have the indication disregard shock loads. Hence, such torque meters have been given very short travel or stroke and correspondingly small displacement, so that under shock conditions, the torque meter element reaches a closely adjusted abutment, any shock loads therebeyond not being indicated hydraulically. For the contact-loading purposes of this invention, it is desired that the torque-meter pressure shall rise simultaneously with, and to the full extent of, all shock loads and I have discovered that this can be achieved by providing the torque meter with an extraordinary range of travel whereby it is free to travel so far (in absorbing any shock to which the system may be subjected) as to displace sufficient oil into the contact-loading piston cavity to make up the elastic displacement therein, however fast this displacement may be from sudden load increases. This provision of extraordinary travel range and displacement in the torque meter itself may be applied to an otherwise conventional torque meter.

My aforementioned Patents No. 2,061,896 and 2,040,833 both disclose torque meters adapted to control the contact-loading pressures of the driving elements of the transmission. But in both of these patents the torque-meter piston has no overtravel since the piston is movable against a fixed abutment at which the pressure relief opening of the torque-meter cavity is closed. In the instant case, the sum of all the deflections of the contact-loaded parts in going from zero to maximum load may correspond to a movement of the order of .030" at the contact-loading piston and the area of the torque-meter piston is about 1/10 of the area of the contact-loading piston. Accordingly, the torque meter is designed so that its piston has an axial range of overtravel equal to 10 times the maximum deflection at the contact-loading piston, i. e., a clear torque-meter piston overtravel of .300". This large torque-meter piston travel affords correspondingly large rotational yield at the connected roller frames which, as before stated, comprises a hydraulic spring drive, in which the displacement of the torque-meter piston supplies the necessarily rapid surge of oil to make-up the contact-loading piston displacement under rapidly rising loads. In other words, the energy necessary for this sudden injection of oil to the contact-loading piston under shock load conditions is abstracted from the shock load itself, quite independently of the flow rate of the pump which serves the system. Accordingly, the pump may be quite small, as its flow rate need only be that normally required to supply the maximum necessary pressure under the incidental leakage occurring at the piston rings and other connections in the system.

Estimates of the rates of flow necessary to create the necessary rate of pressure rise under the shock loading conditions possible when the road wheels of a vehicle encounter pot-holes or obstructions in the road bed at high speed, show that it would be cumbersome, if not impossible, to meet the requirements by mere increase in the size of the torque-meter pump.

Other objects of the invention will become apparent in reading the annexed detailed description in connection with the drawing in which:

Figure 1 is an axial section of a transmission incorporating the invention;

Figure 2 is a fragmentary axial section showing the torque-meter elements near the extreme of their travel under shock loading;

Figure 3 is an end view view of Figure 2; and

Figure 4 is a fragmentary section through the line 4—4 of Figure 2.

The invention is applicable to any transmission upon which it is desired to impose a load proportional to the instantaneous torque load or driving effort, and is here illustrated in conjunction with a double toroidal variable speed transmission such as disclosed, for example, in my co-pending application Serial No. 557,477, filed October 6, 1944. Accordingly, the transmission elements themselves are not a part of this invention and need only brief description.

Referring first to Figures 1 and 2, the transmission may comprise a main shaft 10 carrying toroidal end discs 12 and 14 for rotation therewith and between which is disposed the double-sided toroidal central disc 16. Two sets of rollers 18 and 20 are respectively disposed between discs 16 and 12 and discs 16 and 14 under a contact load axially urging the discs together to provide a variable speed drive between the discs. The disc 16 is drivably connected to a drum 17 which in turn is drivably connected to an output shaft 19 through planetary gearing 21.

The roller contact-loading structure of the present invention includes a piston 22 splined to the main shaft 10 and disc 12 at 24 and 25 respectively and pre-loadable against the end disc 12 by means of the nut 26; the other end disc 14 engaging a shoulder 27 on the shaft 10. The shaft 10 is thus utilized as a tension member to contact-load the discs 12, 14 and 16 against the driving rollers 18 and 20. The disc 12 is provided with a cylindrical member 28 within which the piston 22 is slidably received. The cylindrical member 28 is provided with an end cover 30 to balance out centrifugal pressure effects as later explained. The piston 22 is sealed within the cylindrical member 28 by piston rings 32 and 34 to define a piston-cylinder cavity 36 communicating with an annular torque-meter cavity 42 through passages 38, splines 24, passages 40 and annular groove 41 and thence through radial openings 43 in a bushing 45, annular groove 47 in the hub of a fixed abutment 44 and through openings 49 into cavity 42. The torque meter consists of the abutment member 44 rigidly secured to the end housing 46 and provided with a rigid end member 48. Between the members 44 and 48 there is disposed the torque meter piston member 50 free to travel the width of the cavity 42 which is sealed by piston rings 52 and 54. The rigid abutment member 44 and the torque-meter piston member 50 are equipped with a circumferentially spaced plurality of normally opposed conical pockets 56 and 58 engaged by balls 60. This forms a structure whereby any torque applied to the torque-meter piston member 50 is transformed through anti-friction means into a proportionate axial force acting against the hydraulic fluid, preferably oil, in the torque meter piston cavity 42. Oil pressure is supplied from a gear-type pump 62 driven by suitable gears 64, 66 and 68 and connected to the torque-meter cavity 42 by passage 70 communicating with annular groove 47.

The torque-meter piston member 50 is provided with a metering slot 72 designed so that in the leftward position of the torque-meter piston member 50, as shown in Figure 1, the piston ring 52 defines a narrow opening at the slot 72. It will be seen that slight rotation of the piston member 50 from the position shown will move it to the right thus sealing off the opening of the slot 72 which comprises the sole exit from the cavity 42 for the entire volume of oil delivered by the torque meter pump 62. Under these conditions, the pressure in the piston cavity 42 will build up until it balances the axial reaction generated by the balls 60 and conical pockets 56 and 58 which reaction is at all times proportional to the torque on the torque-meter member 50. This system at all times automatically controls the hydraulic pressure in the torque-meter cavity 42 and in the communicating piston-cylinder cavity 36 to be proportional to the torque imposed on the piston member 50.

In this case the torque is derived from a torque sleeve 74 to which the torque-meter member 50 is slidably splined at 76. The torque sleeve 74 carries rigidly a frame comprising roller supporting arms 78, spokes 80 disposed between the rollers 18 and a hub 82 on which in turn is splined a hub 84 carrying support arms 86 for the rollers 20. The rigid frame just described resists the driving reaction on the rollers 18 and 20 and comprises the torque-reaction member of the transmission, this frame being flexibly anchored by the torque meter through the splines 76. Accordingly the torque meter automatically maintains a pressure within its cavity 42 and within the piston-cylinder cavity 36 which is proportional to the driving torque of the transmission. Therefore, the pressure within cavity 36 is effective to automatically load the toroidal discs 12, 14 and 16 against rollers 18 and 20 with a force proportional to the transmission driving torque (except at small loads when the hydraulic pressure within cavity 36 is less than the pre-load imposed by the nut 26).

At maximum torque the hydraulic torque meter system will impose relatively great pressure in the contact loading piston cavity 36 and on the rollers 18 and 20 and discs 12, 16 and 14 with correspondingly high tension load in the shaft 10. These parts have a certain inherent elastic yield which will result in a physical separation of the disc 12 and the piston 22 as the loads are increased. In the case where the transmission is pre-loaded through the nut 26 to some portion of its maximum contact load, the pre-load is transmitted to the disc 12 by abutments 88, and whenever the hydraulic pressure exceeds the pre-load, the faces at the abutments will separate and the cavity 36 will increase in volume. In a typical case, the separation under maximum torque and contact load might be .030" and when such deflection is produced suddenly as by a shock load on the transmission, this separation must occur with corresponding suddenness. This corresponds to a substantial increase in volume in the contact loading cavity 36 and unless the appropriate amount of hydraulic fluid can be injected into this cavity as rapidly as the shock load itself rises, the contact load would instantaneously lag behind the torque and the rollers might slip.

In the instant case, the area of the torque-meter piston cavity 42 is about 1/10 of the area of the contact-loading piston cavity 36. Accordingly, the torque-meter piston member 50 is afforded a free axial overtravel of 10 times the anticipated maximum axial displacement at the contact-loading cavity 36 whereby the energy for injecting this oil volume is derived from the rotational displacement of the torque-meter member 50 by the shock load, independently of the pump 62. The system may be said to comprise a hydraulic spring drive or shock absorber wherein the energy of the shock is used to inject oil from torque-meter piston cavity 42 into the contact-loading cavity 36 so as to insure that the pressure rise will build up as rapidly as does the shock-driving load which produces it. This action involves substantial rotational displacement of the roller support frames 78, 80, 82, 84 and 86 with the torque sleeve 74 and the torque-meter piston 50 as indicated in the displaced views of Figures 2, 3 and 4. It will be seen that under this relatively great displacement the metering slot 72 is sealed by the piston ring 52 so that the oil in the torque meter has no means of escape except to be injected into the contact-loading cavity 36 to make up for the displacement therein due to the elastic expansion of the system, in accordance with the objectives of the invention.

The stationary torque meter cavity 42 and pump 62 are both hydraulically connected to the rotating contact-loading piston cavity 36 by way of the annular groove 41 within the journal of bearing 45. By this means a contact load proportional to the torque from the (substantially) non-rotating roller-supporting frame system 78, 80, 82, 84 and 86 is transferred to the rotating toroidal discs without the use of thrust bearings subject to the contact load, notwithstanding the relative rotation of these parts.

The roller speed ratio control system may be similar to that disclosed in my aforementioned co-pending application, Serial No. 557,477, and accordingly may comprise axially movable control frames 90 and 92 secured together and restrained to unitary rotation with the roller support frame by guide bars 94 and 96 respectively extending from arms 98 and 99 integral with said support frame, the control frames having angular control blocks 100 controlling the rollers as per above identified co-pending application. The control frames are moved axially as a unit through the arm 98 having a slot 102 engaged by a suitable control means not shown. In this case, in order to allow a free shock-absorbing rotational displacement of the entire roller control and support system, the control slot 102 is made arcuate as indicated in Figure 3.

It will be seen that the conical pockets 58 and 56 are double acting, i. e., either forward or backward shock absorbing rotational displacement of the torque-meter piston member 50 will produce right hand displacement thereof as viewed in Figure 1 against the hydraulic pressure within cavity 42, so that the system is equally effective against forward or reversed shock loading.

There will be slight oil leakage at the bearing sleeve 45, the piston rings 32 and 34 and a certain hydraulic "slippage" in the pump itself. The oil pump may be relatively small as its displacement has merely to be somewhat in excess of this slight leakage under maximum pressure, the excess escaping at the metering slot 72 as required to maintain the torque-proportional pressure. This will be a relatively slow rate of flow notwithstanding that the required rate of flow into the contact-loading cavity 36 may be instantaneously relatively enormous under shock loading. As stated, a prime object of this invention is to derive the energy for this sudden increase in oil pressure and volume in the contact-loading piston cavity 36 from the shock load which demands it and, at the same time, to provide a hydraulic spring drive effect to cushion said shocks through the rotational yield of the roller-supporting frame 78, 80, 82, 84 and 86 from the inherent hydraulic and mechanical elasticity of the entire system.

It should be noted that contact load on the rollers will be either the pre-load established at the nut 26 (under light torque) or the hydraulic load generated by the torque meter in the contact-loading piston cavity 36, whichever is greater, the point being that the pre-load and hydraulic torque-responsive load are not additive. The life of rolling-contact surfaces as between the rollers 18 and 20 and the toric surfaces of the discs 12, 16, 18 is reduced if loads in excess of a certain limiting load are maintained. However, without detracting from the durability of the contact surfaces, loads may be sustained for short periods many times in excess of the optimum-life steady load. Preferably, the preload from the nut 26 will be adjusted for optimum life and the contact load is automatically increased by the hydraulic torque-responsive system whenever an average driving load is exceeded. In automotive vehicles, for example, the average load may be 1/3 or 1/4 of the maximum possible whereas maximum load may only be encountered for a small percentage of the total operating time.

The cover 30 of the cylinder member 28 extends inwardly to the inner diameter of the contact-loading pressure cavity 36 (down to the diameter of the piston ring 32) and thereat is open to atmospheric pressure within the transmission housing. There will be slight leakage at the piston ring 34 which will fill the space beneath the cover 30, the surplus escaping into the housing at atmospheric pressure. It will be seen that the pressure-oil in the piston cavity 36 and the leakage oil on the other side of the piston within the cover 30 will be subject to equal centrifugal force under rotation of the parts and the centrifugal hydraulic pressures are thus balanced out at all speeds. Without this provision, centrifugal effects would add to the pressure generated by the torque meter in the contacting-loading cavity 36, thus destroying the desired torque-proportional contact-load and needlessly overloading the roller contacts at high speeds.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a transmission having members to be loaded into driving engagement, said members being subject to elastic deflections under load, hydraulic cell means for hydraulically loading said members, said cell means increasing in volume in response to elastic deflection of said members under load, means for controlling the magnitude of the hydraulic pressure within said cell means in proportion to the driving torque of said members, said means comprising a hydraulic chamber communicating with said cell means, and a member exposed to the hydraulic pressure within said chamber and movable thereagainst in response to increase in the driving load to control said pressure, said member being movable to displace sufficient liquid into said cell means from said chamber to make up for the increase in volume of said cell under shock loads.

2. In a transmission having members to be loaded into driving contact; a hydraulic pump; a hydraulic cell communicating with the output side of said pump to exert said contact load and being subject to elastic deflections thereunder; a chamber communicating with said cell and with the output side of said pump; a movable member forming a wall of said chamber; and means, responsive to changes in the transmission torque, for displacing said movable member against the hydraulic pressure within said chamber with increase in the transmission torque and vice versa to regulate said pressure; said movable member being displaceable to comprise a yielding drive connection in said transmission such that the energy required to force make-up liquid from said chamber to said cell means, under transmission shock loads, is supplied by the displacement of said movable member by said shock loads.

3. In a transmission having members to be loaded into driving contact; a hydraulic pump; a hydraulic cell in communication with the output side of said pump for hydraulically loading said members; a chamber communicating with said cell and the output side of said pump; a movable member forming a wall of said chamber; and torque-responsive means for displacing said movable member against the hydraulic pressure within said chamber to comprise a hydraulic cushion against shock loads and to regulate said hydraulic pressure; the displacement of said movable member, as it yields to shock loads, being sufficient to supply the liquid volume necessary to make up for any elastic deflection at said cell independently of any increase in liquid flow from said pump.

4. In a transmission: a hydraulic pump; a hydraulic cell communicating with the output side of said pump for contact-loading said transmission and being subject to elastic deflection under load; a chamber communicating with the output side of said cell and with the output side of said pump; a member exposed to the hydraulic pressure within said chamber; and means for moving said member against said pressure in response to increase in transmission torque to regulate said pressure; said member being movable to comprise a yielding drive connection in said transmission adapted, under said yield, to displace sufficient liquid from said chamber to said cell to make up for said deflection of said cell means under sudden loads.

5. In a transmission having members to be loaded into driving contact; a hydraulic cell for loading said members and subject to elastic deflections under said loading; a chamber communicating with said cell; a member forming a wall of said chamber; and means for moving said wall-forming member against the liquid within said chamber in response to increase in transmission torque; said chamber and member comprising a yielding shock absorbing connection in said transmission by displacement of liquid, by said movable member, from said chamber to said cell such that the energy causing said elastic deflections is absorbed from the shock producing said liquid displacement.

6. In a transmission having drive members to be loaded into driving engagement; a hydraulic pump; a hydraulic cell communicating with the output side of said pump for loading said members; means for controlling the magnitude of the hydraulic pressure within said cell in proportion to the driving torque on said members; said means comprising a hydraulic chamber communicating with said cell and with the output side of said pump; a movable member exposed to the hydraulic pressure within said chamber; and means for moving said movable member against said pressure in response to increase in the driving torque to control said pressure proportionately to said torque, said movable member having a range of movement sufficient to displace liquid into said cell from said chamber to make up for any increase in volume of said cell resulting from elastic deflections of said drive members or said cell under load.

7. In a transmission having drive members to be loaded into driving engagement; a hydraulic pump; a hydraulic cell communicating with the output side of said pump for loading said members; means for controlling the magnitude of the hydraulic pressure within said cell in proportion to the driving torque on said members; said means comprising a hydraulic chamber communicating with said cell and with the output side of said pump; a movable member exposed to the hydraulic pressure within said chamber; means for moving said movable member against said pressure in response to increase in the driving torque; and a valve port controlled by movement of said movable member for regulating said hydraulic pressure proportionately to said torque; said movable member having a sufficient range of movement, beyond its position at which said valve port is controlled for maximum pressure, to displace enough liquid into said cell from said chamber to make up for any increase in volume of said cell resulting from elastic deflections of said drive members or said cell under load.

8. In a transmission having drive members to be loaded into driving engagement; a hydraulic pump; a hydraulic cell communicating with the output side of said pump for loading said members; means for controlling the magnitude of the hydraulic pressure within said cell in proportion to the driving torque on said members; said means comprising a hydraulic chamber communicating with said cell and with the output side of said pump; a movable member forming a wall of said chamber and exposed to the hydraulic pressure therewithin; a pressure relief port for said pump; means responsive to increase in said torque for effecting movement of said movable member against the hydraulic pressure within said chamber to effect a closing adjustment of said relief port for regulating said hydraulic pressure proportionately to said torque; said movable member having a sufficient range of movement against said hydraulic pressure, beyond the point at which said relief port closes, to displace enough liquid from said chamber into said cell to make up for any increase in volume of said cell as a result of elastic deflections of said drive member or said cell under load.

9. In a transmission having drive members to be loaded into driving engagement; a hydraulic pump; a first piston and cylinder assembly for hydraulically loading said members; a second piston and cylinder assembly; means providing passageways establishing communication between each of said assemblies and the output side of said pump; means, responsive to an increase in the transmission torque, for effecting movement of the piston of said second assembly against the hydraulic pressure supplied thereto by said pump to control said pressure proportionately to said torque; said second piston and cylinder assembly providing sufficient travel of its piston to displace enough liquid from said second assembly to said first assembly to make up for any increase in the volume of the hydraulic cell, defined by said first assembly, as a result of elastic deflections of said drive members or said cell under load.

10. In a transmission having driving members to be loaded into driving engagement; a hydraulic pump; a first piston and cylinder assembly for loading said members; a second piston and cylinder assembly; means providing passageways establishing communication between each of said assemblies and the output side of said pump; a pressure relief port for said pump; means, responsive to an increase in the transmission torque, for effecting movement of the piston of said second assembly against the hydraulic pressure supplied thereto by said pump to effect a closing adjustment of said relief port to increase said pressure proportionately to said torque; said second piston and cylinder assembly providing sufficient travel of its piston, beyond the point at which said relief port closes, to displace enough liquid from said second assembly to said first assembly to make up for any increase in the volume of the hydraulic cell, defined by said first assembly, as a result of elastic deflections of said drive members or said cell under load.

ROLAND CHILTON.

REFERENCES CITED

The following references are of record in the file of this patent:

UNITED STATES PATENTS

| Number | Name | Date |
|---|---|---|
| 2,233,967 | Wellton | Mar. 4, 1941 |